United States Patent
Alhaug

(10) Patent No.: US 11,525,531 B2
(45) Date of Patent: Dec. 13, 2022

(54) SEAL AND INSULATOR FOR PIPE HAVING AN INSULATED ELECTRICAL CONDUCTOR

(71) Applicant: Reelwell A.S., Sola (NO)

(72) Inventor: Espen Alhaug, Stavanger (NO)

(73) Assignee: Reelwell A.S., Sola (NO)

( * ) Notice: Subject to any disclaimer, the term of this patent is extended or adjusted under 35 U.S.C. 154(b) by 210 days.

(21) Appl. No.: 16/902,295

(22) Filed: Jun. 16, 2020

(65) Prior Publication Data

US 2021/0388925 A1    Dec. 16, 2021

(51) Int. Cl.
*F16L 25/02* (2006.01)
*F16L 25/01* (2006.01)

(52) U.S. Cl.
CPC ............. *F16L 25/021* (2013.01); *F16L 25/01* (2013.01)

(58) Field of Classification Search
CPC ....... F16L 25/021; F16L 15/003; F16L 25/01; E21B 17/003; E21B 17/042; E21B 17/0285
See application file for complete search history.

(56) References Cited

U.S. PATENT DOCUMENTS

| | | | | |
|---|---|---|---|---|
| 4,537,457 A | * | 8/1985 | Davis, Jr. ............... | E21B 17/028 439/190 |
| 4,557,538 A | * | 12/1985 | Chevalier ............. | E21B 17/028 439/271 |
| 4,806,115 A | * | 2/1989 | Chevalier ............ | H01R 13/523 439/194 |
| 7,114,970 B2 | * | 10/2006 | Head ..................... | E21B 17/028 439/191 |
| 7,518,527 B2 | * | 4/2009 | Radzinski ............... | H01Q 1/04 340/854.6 |
| 7,605,715 B2 | * | 10/2009 | Clark .................... | E21B 17/003 340/854.6 |

(Continued)

FOREIGN PATENT DOCUMENTS

| | | |
|---|---|---|
| EP | 3365525 A1 | 8/2018 |
| WO | 03/001023 A1 | 1/2003 |

OTHER PUBLICATIONS

International Search Report and Written Opinion dated Sep. 21, 2021, for International Application No. PCT/IB2021/055314.

*Primary Examiner* — Matthew Troutman
*Assistant Examiner* — Alexander T Rufrano
(74) *Attorney, Agent, or Firm* — Richard A. Fagin

(57) ABSTRACT

A pipe segment having an insulated electrical conductor includes a first electrical contact disposed at one end of an electrical conductor on an interior of the pipe segment from a male threaded connection on one end to a female threaded connection on the other end of the pipe segment. A second electrical contact is on the other end of the insulated electrical conductor. The first contact makes electrical connection with the second contact in an adjacent segment when the male connection on one segment is engaged to the female connection on the adjacent segment. A seal disposed on an interior of an insulating layer on an interior wall of each respective pipe segment provides a space beyond the end of the seal to enable inward flexure of the seal under pressure such that lubricant extruded by connecting the male threaded end and the female threaded end is pressure relieved.

10 Claims, 5 Drawing Sheets

(56) References Cited

U.S. PATENT DOCUMENTS

| | | | |
|---|---|---|---|
| 8,950,787 B2* | 2/2015 | Chabas | E21B 17/028 |
| | | | 340/854.7 |
| 2003/0075319 A1* | 4/2003 | Chau | E21B 47/0232 |
| | | | 175/320 |
| 2006/0021799 A1* | 2/2006 | Hall | H01R 13/005 |
| | | | 175/320 |
| 2008/0041575 A1 | 2/2008 | Clark et al. | |
| 2008/0110638 A1* | 5/2008 | Hall | E21B 17/028 |
| | | | 166/381 |
| 2019/0119990 A1* | 4/2019 | Fredriksen | E21B 17/028 |

* cited by examiner

SEAL AND INSULATOR FOR PIPE HAVING AN INSULATED ELECTRICAL CONDUCTOR

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of metal pipe such as may be used in drilling wells. More specifically, the disclosure relates to seals used in connector with such pipes having insulated electrical conductors therein so as to exclude fluids from creating an electrical short circuit between the electrical conductor and the metal pipe.

Canadian Patent No. 3,002,675 assigned to the assignee of the present disclosure, describes a structure and a method for making metal pipe having therein an insulated electrical conductor. Such pipe may be used, for example, in well drilling in the same manner as conventional thread connected, segmented drill pipe, with the additional feature of the insulated electrical conductor to provide a power and signal channel. Such power and signal channel can provide the ability to operate certain types of equipment in a well during drilling and at substantially higher power capacity and rate at which signals may be communicated between the surface and such equipment using other power and signal devices.

Described generally, pipe made according to the '675 patent comprises assembling electrical contacts to each end of a selected length of electrical conductor. The electrical conductor is formed so that it can be radially expanded without plastic deformation, while at the same time being correspondingly longitudinally shortened when inserted into a segment of the metal pipe. The segment of the metal pipe may have features machined on its interior surfaces to retain the electrical contacts in place longitudinally. The interior surface of the pipe segment may be covered with an insulating layer to electrically isolate the conductor from the pipe segment.

An important aspect of the foregoing pipe is a seal disposed in at least one longitudinal end of one of the pipe segments. Such seal excludes fluid from entering a space between the electrical contacts and the interior wall of the pipe segment. Such spaces exist because of the structure of the electrical contacts and corresponding interior surfaces of the pipe section. Such seal has as functional criteria: as little effect as possible on handing, and use of the pipe including as assembled and disassembled; and as completely as practical consistent with the foregoing, excluding fluid from entering the above described spaces. It is also desirable for such seal to avoid closing relief paths for thread lubricant (pipe dope) applied during assembly of pipe segments to each other by threading.

SUMMARY

One aspect of the present disclosure is a pipe segment having an insulated electrical conductor. A pipe segment according to this aspect includes a first electrical contact disposed at one end of an electrical conductor on an interior of the pipe segment from a male threaded connection on one end to a female threaded connection on the other end of the pipe segment. A second electrical contact is disposed on the other end of the insulated electrical conductor. The first electrical contact makes electrical connection with the second electrical contact in an adjacent segment when the male connection on one pipe segment is engaged to the female connection on the adjacent pipe segment. A seal disposed on an interior of an insulating layer on an interior wall of each respective pipe segment provides a space beyond the end of the seal to enable inward flexure of the seal under pressure such that lubricant extruded by connecting the male threaded end and the female threaded end is pressure relieved.

In some embodiments, the seal comprises elastomer.

In some embodiments, wherein the elastomer comprises polyurethane or nitrile rubber.

In some embodiments, wherein at least one of the first electrical contact and the second electrical contact comprises a groove, and the seal comprises an internal shoulder to engage the groove.

In some embodiments, the seal comprises an external lip whereby energized seal contact with an interior wall of the space is maintained after inward flexure of the seal.

Some embodiments further comprise at least one relief port in at least one of the first and the second electrical contact.

Other aspects and possible advantages will be apparent from the description and claims following.

DETAILED DESCRIPTION

Figure 1:
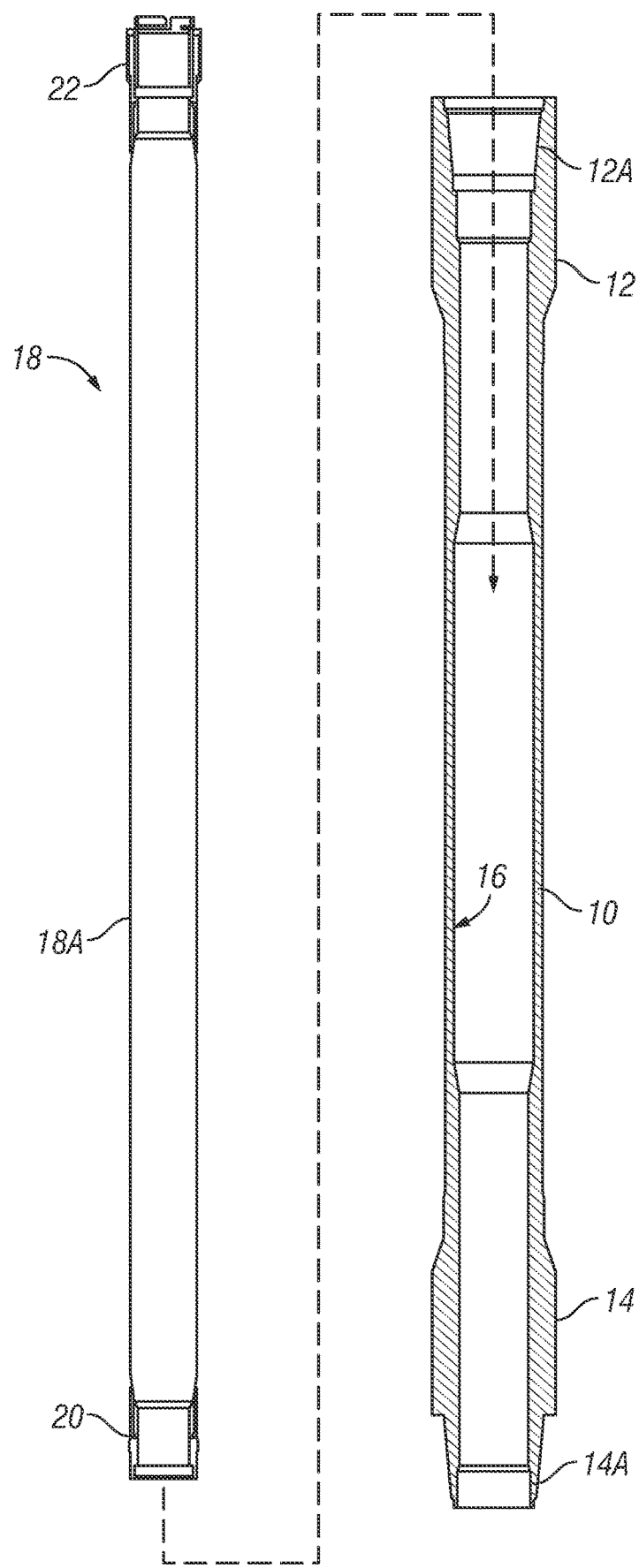
FIG. 1 shows a pre-assembled view of a pipe segment that may be made and used in accordance with the present disclosure.

A "wired" pipe segment or "joint" is shown in FIG. 1 prior to assembly of an electrical conductor 18 into a joint of pipe 10, such as drill pipe. The pipe joint 10 may comprise a female threaded end 12 having internal threads 12A, for example, tapered threads made according to the intended use of the pipe joint 10. As an example and without limitation, the threads 12A may be American Petroleum Institute (API) internal flush (IF) pattern thread. The other end of the pipe joint 10 may comprise a male threaded end 14 having external threads 14A thereon shaped to engage the internal threads (see 12A) on an adjacent joint of pipe. As will be familiar to those skilled in the art, such threads make possible assembly of a pipe composed of a plurality of such joints to any selected length. The pipe joint 10 may comprise an electrical insulation layer 16 disposed on the interior surface of the pipe joint 10. Types of insulating material and techniques for affixing the insulation layer 16 are disclosed in Canadian Patent No. 3,002,675 assigned to the assignee of the present disclosure.

An electrical conductor assembly 18, comprising an electrical conductor 18A having a respective electrical contact, shown as a first contact 20 and a second contact 22 at each longitudinal end may be inserted into the pipe joint 10 and radially expanded to conform to the interior wall of the pipe joint 10. The electrical conductor 18A as explained in Canadian Patent No. 3,002,675 is structure to be radially expanded without plastic deformation, while longitudinally contracting so as to seat the electrical contacts 20, 22 in respective features formed into the interior wall of the pipe joint 10.

Figure 2:
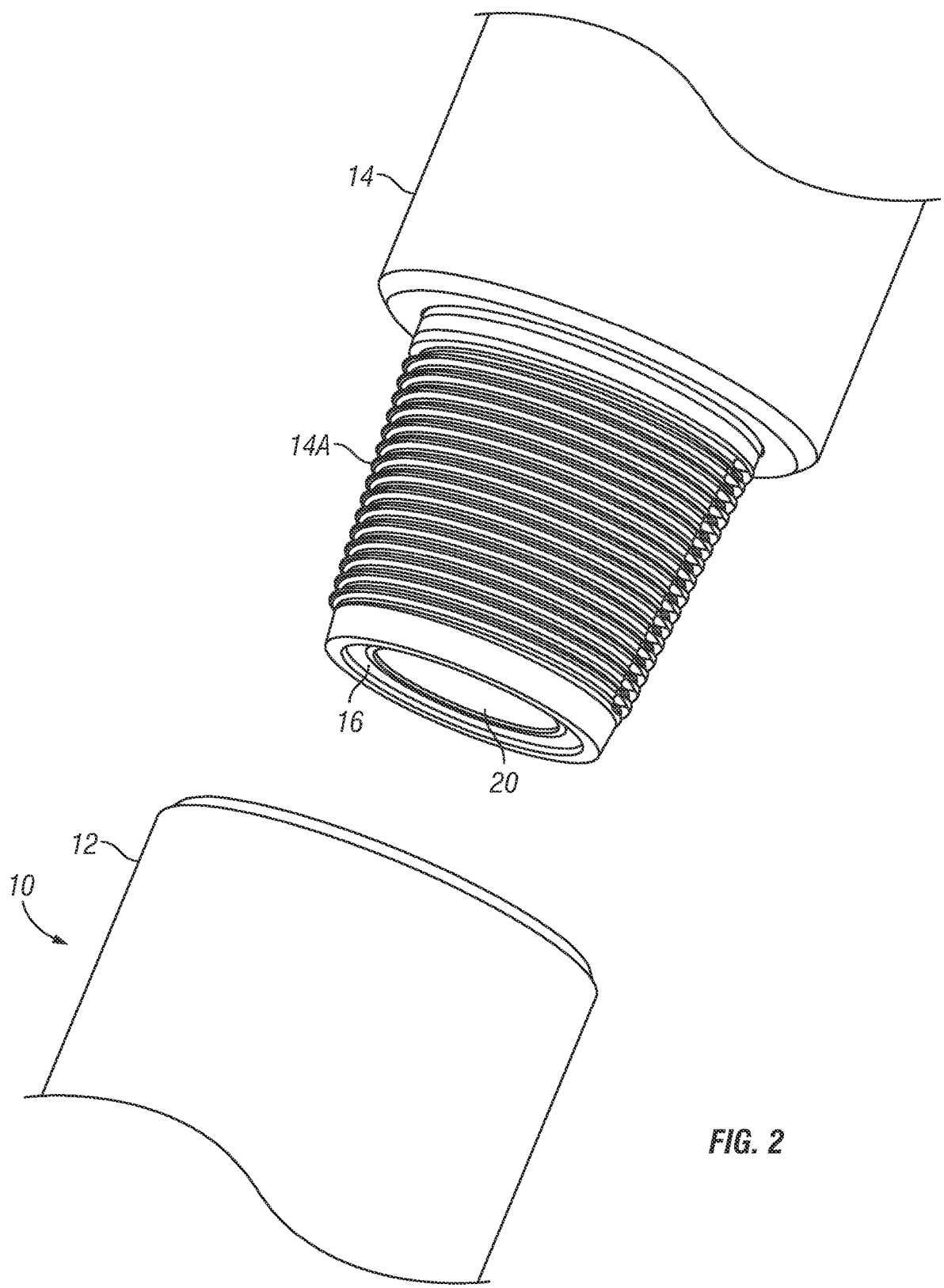
FIG. 2 shows a perspective view of two adjacent pipe segments as in FIG. 1 prior to threaded assembly.

FIG. 2 shows a perspective view of the threaded end of one pipe joint 10 prior to assembly to an adjacent pipe joint 10. The external threads 14A on the male threaded end 14 are disposed for assembly proximate the female threaded end 12 on the adjacent pipe joint 10. What may be observed in FIG. 2 is the electrical contact 20 and electrical insulating layer 16 proximate the male threaded end 14.

Figure 3:
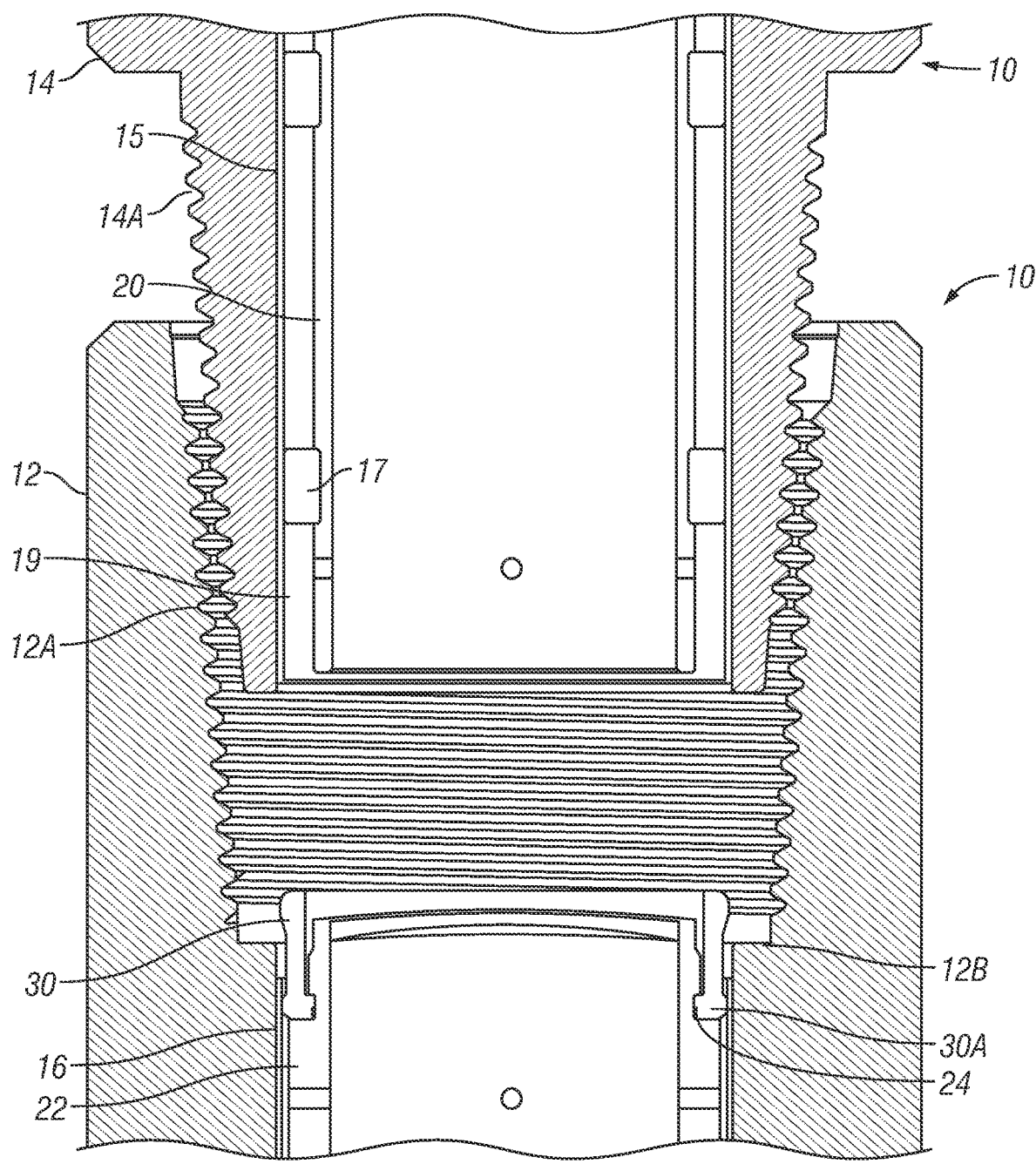
FIG. 3 shows a cross-section view of the pipe segments of FIG. 2 just prior to thread engagement.

A more complete view of the foregoing, showing internal components of both threaded ends on the adjacent pipe joints is shown in FIG. 3. The view in FIG. 3 is just prior to starting the thread connection between the adjacent pipe joints 10. The electrical contact 20 in the male threaded end 14 may be held in radial position inside the pipe joint 10 by standoffs or spacers 17 or similar structure, because the electrical contact 20 is not radially expanded and bonded to the interior wall of the pipe as is the electrical conductor (18A in FIG. 1), through the intermediate insulator 16. Details of the electrical conductor and its assembly into the pipe joint 10 and the (first electrical contact, hereinafter just the "contact") electrical contact 20 may be similar to those set forth in Canadian Patent No. 3,002,675, although the structures disclosed therein are not intended to limit the scope of the present disclosure. The (second contact, hereinafter "adjacent" electrical contact) adjacent electrical contact 22 is disposed in the female threaded end 12 of the adjacent pipe joint 10. An example embodiment of the adjacent electrical contact 22 and its connection to the electrical contact 20 will be further explained with reference to FIGS. 5 and 6. The adjacent electrical contact 22 may comprise a seal 30 on its exterior surface. The adjacent electrical contact 22 and the seal 30 may extend longitudinally from the thread base 12B of the female threaded end 12 such that the adjacent electrical contact 22 makes good electrical connection with the electrical contact 20, and the seal 30 engages the electrical contact 20 to exclude fluid from entering a space 19 between the electrical contact 20 and the interior wall of the pipe joint 10. Such sealing maintains electrical insulation between the electrical conductor (18 in FIG. 1) and the pipe joint 10. In the example embodiment shown in FIG. 3, the seal 30 may comprise an internal shoulder 30A that fits in a corresponding external groove 24 in the adjacent electrical contact 22. In other embodiments, a similar groove may be formed in the electrical contact 20 and the seal 30 may be disposed thereon; the example embodiment shown in FIG. 3 is only one example of how to structure the seal 30 to maintain its longitudinal position. The shoulder 30A is only a convenience and may be omitted or placed elsewhere in some embodiments. In some embodiments, for example, a groove (not shown) may be formed in the inner wall of either pipe joint to accommodate a corresponding external lip or shoulder (not shown) on the seal 30.

The seal 30 may be made, for example, from any suitable elastomer capable of withstanding fluid pressure and temperature to which the pipe segments 10 are to be exposed, for example and without limitation, polyurethane and nitrile rubber.

Figure 4:
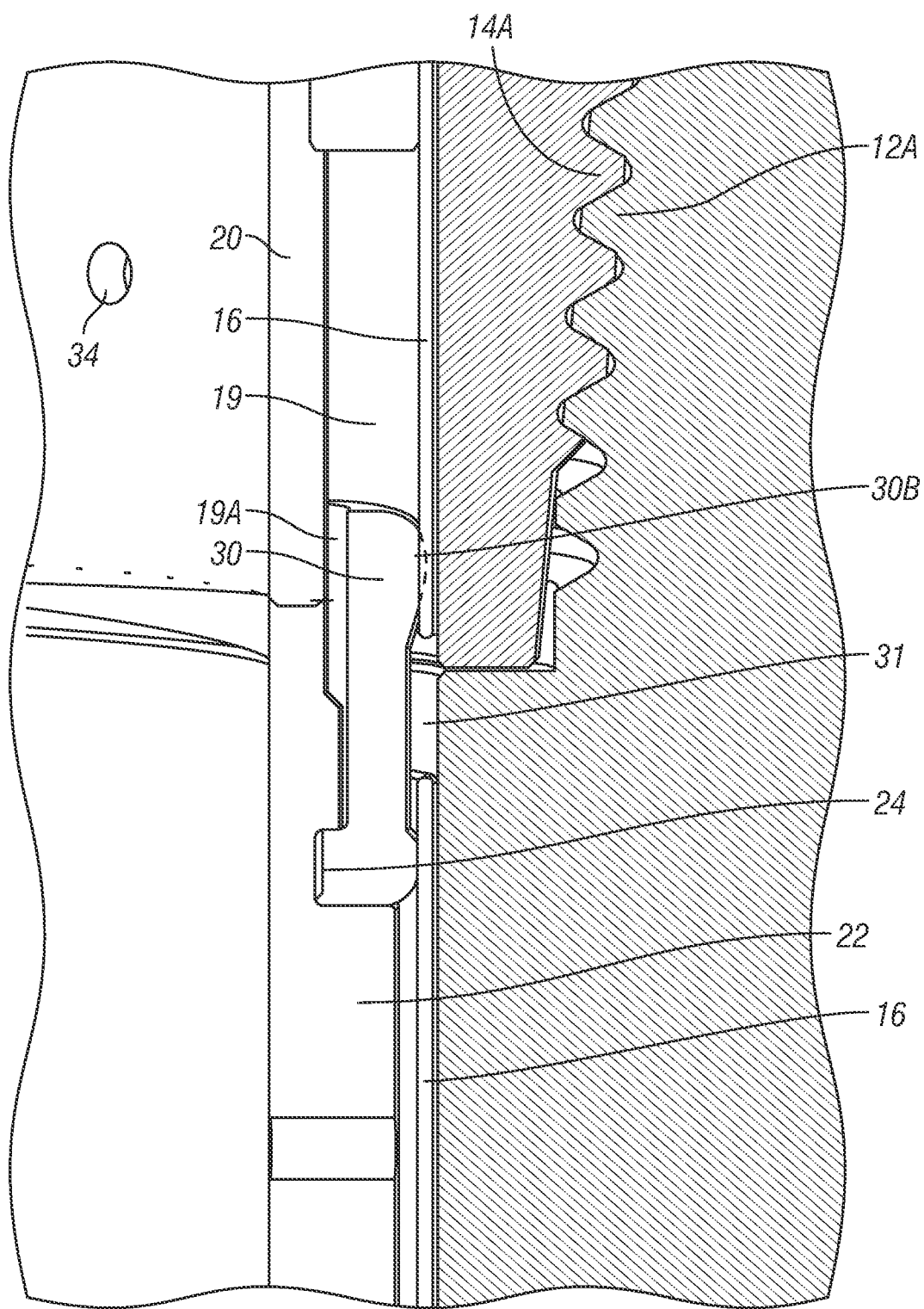
FIG. 4 shows an expanded cross-section view of the pipe segments of FIG. 3 after full thread engagement.

FIG. 4 shows an expanded view of the pipe joints 10 in FIG. 3 wherein the threads 14A on the male threaded end 14 of one pipe joint 10 are fully engaged with the corresponding threads 12A on the female threaded end 12 of the adjacent pipe joint 10. When the threads are so engaged, the (first) electrical contact 20 and the adjacent (second) electrical contact 22 are placed into electrical contact with each other. At the same time, the seal 30 is moved into the space 19 between the electrical contact 20 and the interior of the male threaded end 14. The seal 30 thus prevents fluid entry from the interior of the pipe joints 10 into a void space 31, thus electrically isolating the electrically contacted electrical contacts 20, 22 from the pipe joints 10. The seal 30 may include an external lip or ring 30B to enable some flexing radially inwardly of the seal 30 while still being energized against the interior wall of the pipe joint 10, such as may be further defined by the insulating layer 16. In this way, the relief space 19 between the interior wall of the adjacent pipe joints 10 and the exterior of the seal 30 may be provided such that thread lubricant (pipe dope) may be extruded into the relief space 19. Such feature enables the pipe joints to be threadedly connected without the need to provide an additional relief feature to relieve pressure of extruded thread lubricant. The seal 30 may be shaped so that there is relief space 19A radially between the contact 20 and/or adjacent contact 22 enabling some inward flexure of the seal 30, whereby lubricant under pressure more readily vents into the relief space 19. In some embodiments, one or more relief ports 34 may be provided to enable excess thread lubricant to be discharged into the interior of the pipe joint 10.

Figure 5:
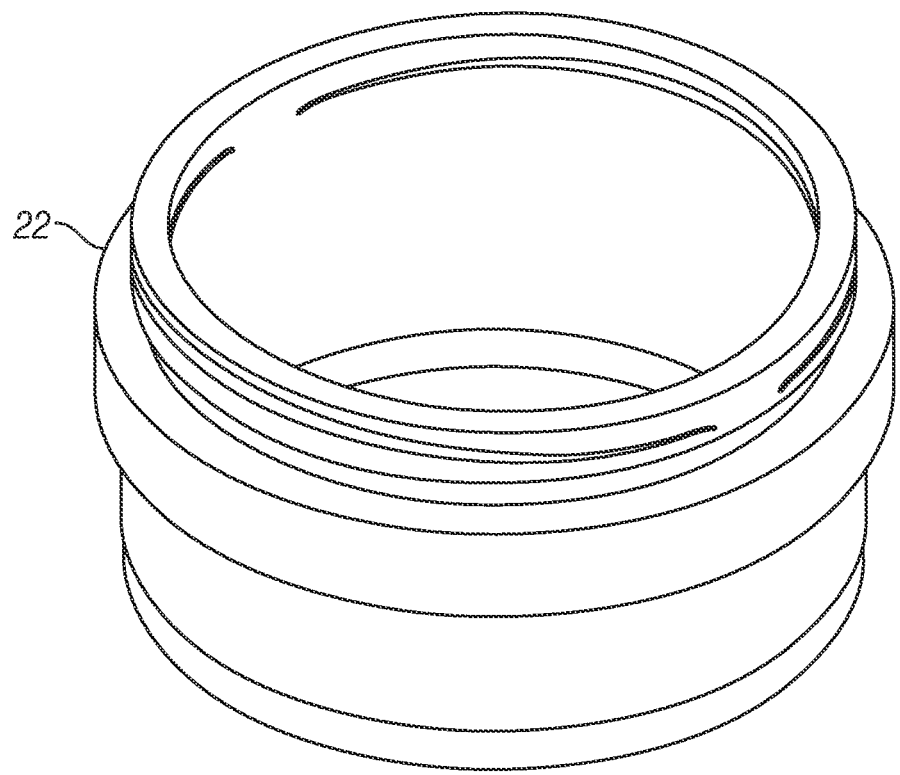
FIGS. 5 and 6 show, respectively, perspective an side views of an electrical contact that may be used in some embodiments.
Figure 6:
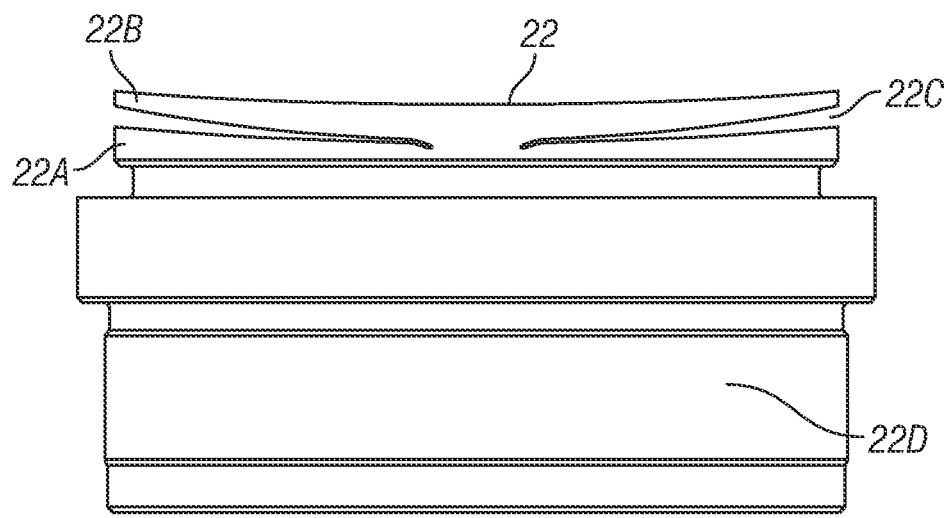

FIGS. 5 and 6 show the adjacent electrical contact 22 in more detail. An electrical contact body 22A may include a portion 22D thereof which may be assembled, e.g., interference a connector at the end of the electrical conductor as more fully set forth in Canadian Patent No. 3,002,675. The electrical contact body 22A may include a flange at a longitudinal end of the electrical contact body 22A that may be cut or otherwise formed to create a contact ring 22B from the flange. In the present example embodiment, a wedge shaped recess 22C on opposed circumferential sides of the electrical contact body 22A may be formed, e.g., by electrode discharge machining, so that the contact ring 22B when axially compressed against the axial end face of the pin end electrical contact (20 in FIG. 4) the contact ring 22B may deflect as a result of the axial force applied to the contact ring 22B. In the present embodiment, the adjacent electrical contact 22 may be made from an electrically conductive material having an elastic limit that is lower than the bending strain applied to the contact ring 22B when it is compressed against the pin end electrical contact (20 in FIG. 4).

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A structure for pipe segments having an insulated electrical conductor, comprising:
   a first electrical contact disposed at one end of an insulated electrical conductor extending on an interior of a first pipe segment from a male threaded connection on one longitudinal end of the first pipe segment to a female threaded connection on another longitudinal end of the first pipe segment;
   a second electrical contact disposed on the other end of the insulated electrical conductor, the first electrical contact shaped to make electrical connection with a corresponding second electrical contact in a second, adjacent pipe segment having a first electrical contact, an insulated electrical conductor, the corresponding second electrical contact, a male threaded connection and a female threaded connection, when the male threaded connection on the first pipe segment is engaged to the female threaded connection on the second pipe segment;
   a seal disposed on an interior of an insulating layer on an interior wall of each of the first and second pipe segments, a space provided beyond a longitudinal end of the seal between at least one of the first and second electrical contacts and the insulating layer, wherein the space enables radial inward flexure of the seal under pressure such that thread lubricant extruded by connecting the male threaded end of the first pipe segment to the female threaded end of the second pipe segment is pressure relieved.

2. The structure of claim 1 wherein the seal comprises elastomer.

3. The structure of claim 2 wherein the elastomer comprises polyurethane or nitrile rubber.

4. The structure of claim 1 wherein at least one of the first electrical contact and the second electrical contact comprises a groove, and the seal comprises an internal shoulder to engage the groove.

5. The structure of claim 1 wherein the seal comprises an external lip whereby radially energized seal contact with an interior wall of the space is maintained after radial inward flexure of the seal.

6. The structure of claim 1 further comprising at least one relief port in at least one of the first and the second electrical contact, the at least one relief port making hydraulic connection between the space and an interior bore of the pipe segment within the insulated electrical conductor.

7. A threadedly connectible pipe segment having an insulated electrical conductor, comprising:
   a first electrical contact disposed at one end of an insulated electrical conductor, the insulated electrical conductor extending on an interior of the pipe segment from a male threaded connection on one longitudinal end of the pipe segment to a female threaded connection on another longitudinal end of the pipe segment;
   a second electrical contact disposed on the other end of the insulated electrical conductor;
   an insulating layer disposed between an interior wall of the pipe segment and an exterior of the insulated electrical conductor;
   a seal disposed on an interior of the insulating layer proximate a longitudinal end of the insulating layer, the seal extending longitudinally beyond a longitudinal end of the second electrical contact, the seal having an external lip disposed at a longitudinal end of the seal extending beyond the longitudinal end of the second electrical contact; and
   wherein the first electrical contact defines an annular space between the interior of the insulating layer and an exterior of the first electrical contact sufficient to enable radial inward flexure of the seal, first electrical contact having at least one port making hydraulic connection between the annular space and an interior bore through an interior of the insulated electrical conductor.

8. The pipe segment of claim 7 wherein the seal comprises elastomer.

9. The pipe segment of claim 8 wherein the elastomer comprises polyurethane or nitrile rubber.

10. The pipe segment of claim 7 wherein at least one of the first electrical contact and the second electrical contact comprises an external groove, and the seal comprises an internal shoulder to engage the groove.

* * * * *